United States Patent
Roeder et al.

(10) Patent No.: US 10,381,655 B2
(45) Date of Patent: Aug. 13, 2019

(54) SURFACE MODIFIED SOFC CATHODE PARTICLES AND METHODS OF MAKING SAME

(71) Applicants: Jeffrey F. Roeder, Brookfield, CT (US); Anthony F. Zeberoff, Bethel, CT (US); Peter C. Van Buskirk, Newtown, CT (US)

(72) Inventors: Jeffrey F. Roeder, Brookfield, CT (US); Anthony F. Zeberoff, Bethel, CT (US); Peter C. Van Buskirk, Newtown, CT (US)

(73) Assignee: Sonata Scientific LLC, Bethel, CT (US)

(*) Notice: Subject to any disclaimer, the term of this patent is extended or adjusted under 35 U.S.C. 154(b) by 299 days.

(21) Appl. No.: 15/209,747

(22) Filed: Jul. 13, 2016

(65) Prior Publication Data

US 2017/0018782 A1    Jan. 19, 2017

Related U.S. Application Data

(60) Provisional application No. 62/192,033, filed on Jul. 13, 2015.

(51) Int. Cl.
| | |
|---|---|
| *H01M 4/90* | (2006.01) |
| *H01M 4/86* | (2006.01) |
| *H01M 4/88* | (2006.01) |
| *H01M 4/92* | (2006.01) |
| *H01M 8/12* | (2016.01) |
| *H01M 8/124* | (2016.01) |

(52) U.S. Cl.
CPC ....... *H01M 4/9033* (2013.01); *H01M 4/8657* (2013.01); *H01M 4/8867* (2013.01); *H01M 4/8885* (2013.01); *H01M 4/9025* (2013.01); *H01M 4/925* (2013.01); *H01M 8/12* (2013.01); *H01M 2004/8689* (2013.01); *H01M 2008/1293* (2013.01)

(58) Field of Classification Search
CPC .. H01M 4/9033; H01M 4/925; H01M 4/9025; H01M 4/8885; H01M 4/8867; H01M 8/12; H01M 4/8657; H01M 2004/8689; H01M 2008/1293
See application file for complete search history.

(56) References Cited

U.S. PATENT DOCUMENTS

| | | | | |
|---|---|---|---|---|
| 2004/0043284 | A1* | 3/2004 | Biedenkope | H01M 4/8885 429/478 |
| 2009/0209095 | A1* | 8/2009 | Horii | H01L 21/28035 438/585 |
| 2010/0227476 | A1* | 9/2010 | Peck | C23C 16/40 438/680 |

(Continued)

*Primary Examiner* — Muhammad S Siddiquee
(74) *Attorney, Agent, or Firm* — Gregory Stauf

(57) ABSTRACT

A novel method to modify the surface of lanthanum and strontium containing cathode powders before or after sintering by depositing layers of gadolinium doped ceria (GDC) and/or samarium doped ceria or similar materials via atomic layer deposition on the powders. The surface modified powders are sintered into porous cathodes that have utility enhancing the electrochemical performance of the cathodes, particularly for use in solid oxide fuel cells. Similar enhancements are observed for surface treatment of sintered cathodes.

19 Claims, 7 Drawing Sheets

(56) References Cited

U.S. PATENT DOCUMENTS

| | | | | |
|---|---|---|---|---|
| 2011/0076556 A1* | 3/2011 | Karthikeyan | ......... | H01M 4/366 |
| | | | | 429/188 |
| 2012/0270139 A1* | 10/2012 | Park | ................... | C04B 35/2633 |
| | | | | 429/485 |
| 2013/0059073 A1* | 3/2013 | Jiang | ................... | C23C 16/4417 |
| | | | | 427/212 |
| 2014/0141542 A1* | 5/2014 | Kang | ................... | C23C 16/345 |
| | | | | 438/14 |
| 2015/0162621 A1* | 6/2015 | Nada | ..................... | C01G 51/68 |
| | | | | 502/303 |
| 2015/0380722 A1* | 12/2015 | Blangero | ............. | H01M 4/525 |
| | | | | 429/231.3 |

\* cited by examiner

SURFACE MODIFIED SOFC CATHODE PARTICLES AND METHODS OF MAKING SAME

CROSS REFERENCE TO RELATED APPLICATIONS

This application is a U.S. Utility application taking priority from U.S. Provisional application No. 62/192,033, filed Jul. 13, 2016, and herein incorporated by reference.

BACKGROUND OF THE INVENTION

References

"NETL's Fuel Cell Program Overview," S. Vora, 15th SECA Workshop, Pittsburgh, Pa. 2014.
A. J. Jacobson, "Materials for Solid Oxide Fuel Cells," Chem. Mater. 22 (2010) 660-674.
T. T. Fister, D. D. Fong, J. A. Eastman, P. M. Baldo, M. J. Highland, P. H. Fuoss, K. P. Balasubramaniam, J. C. Meador, and P. A. Salvador, "In situ characterization of strontium surface segregation in epitaxial La0.7Sr0.3MnO3 thin films as a function of oxygen partial pressure," Appl. Phys. Lett. 93 (2008) 151904.
W. Cheuh, "Revealing Cathode Surfaces under Operation," 15th SECA Workshop, Pittsburgh, Pa. 2014.
S. Gopalan, "Carbon Dioxide Effects on LSCF Cathodes for Solid Oxide Fuel Cells," 15th SECA Workshop, Pittsburgh, Pa. 2014.
M. Liu, "Enhancing Cathode Performance and Stability Through Infiltration," 13th SECA Workshop, Pittsburgh, Pa., 2012; M. Liu, et al., "Enhanced performance of LSCF cathode through surface modification," Int. J. Hydrogen Energy 37 (2012) 8613-8620.
Y. Gong, R. L. Patel, X. Liang, D. Palacio, X. Song, J. B. Goodenough, and K. Huang, Chem. Mater. 25, 4224 (2103).
Y. Gong, D. Palacio, X. Song, R. L. Patel, X. Liang, Z. Zhao, J. B. Goodenough, and K. Huang, Nano Lett. 13, 4340 (2013).
H. J. Choi, K. Bae, J. W. Kim, J. Koo, G. D. Han, S. W. Park, C. Lansalot-Matras, J.-W. Son and J. H. Shim, ALD 2015, Portland, Oreg. (2015).

The present invention relates to the formation of barrier layers on cathode powders used to make solid oxide fuel cell (SOFC) cathodes to reduce migration of cations to the cathode surface and to improve performance and long term reliability of the SOFC.

Solid oxide fuel cell (SOFC) technology represents an efficient means to utilize a variety of fossil fuels, with exceptional promise for reduced carbon footprint. Although commercial systems are starting to be deployed, significant improvements are needed. Widespread adoption of SOFCs requires improvements in long-term reliability on the order of 5-7 times the current degradation rate per 1000 hours of operation.

SOFCs have three main layers in the structure, an anode, an electrolyte, and a cathode. A fourth layer that acts as a reaction barrier may be placed between electrolyte and the cathode. While the electrolyte and the barrier are usually dense ceramics, the electrodes are porous to allow diffusion of the reactant and product gases. Gas phase electrochemical reactions occur at the electrodes are used to produce electricity from the cell.

Strontium based ceramic cathodes e.g., lanthanum strontium manganese oxide (LSM) and lanthanum strontium iron cobalt oxide (LSFC) have been examined extensively for use in solid oxide fuel cells (SOFCs). LSM has high electrical conductivity and $O_2$ electrochemical activity, while LSCF offers both high electrical and ionic conductivity. Hence, LSCF has become a primary choice for SOFC cathodes, although LSM and other lanthanum-strontium oxides are used. In many cases these lanthanum-strontium oxides are used in the form of cathode powders, whose particles are sintered to make cathodes. Performance of LSCF is very good, but cathode degradation occurs during operation at elevated temperatures, limiting the operating lifetime of the SOFC. Although significant work has been carried out to examine alternatives, LSCF cathodes remain predominant due to their combination of good ionic and electronic conductivity, as well as sintering temperatures favorable for anode supported fabrication schemes. Sr migration to the LSCF surface is a key issue for degradation of the cathode.

Recently, surface modification after sintering has been shown to improve performance and the stability of fabricated LSCF cathodes. Known as "infill", a coating is applied via a solution route to the cathode after fabrication of the SOFC stack. In the case of an LSCF backbone with an LSM infilled coating, performance was significantly enhanced, and Sr surface enrichment was not observed. The infill coating may also be produced by atomic layer deposition (ALD). Examples of infill via ALD include ZrO and $La_{1-x}Sr_xCoO_{3-\delta}$ (LSC).

While an infilled cathode arguably represents the state of the art, it is viewed by some as an extra process step in the fabrication process for SOFC manufacturers. An alternative route to improved surface modified cathode powders comprises a core-shell type structure that could provide the benefits of surface modification of a fully processed cathode but in a raw cathode powder that can act as a drop in replacement for existing cathode powders to create an infill-like cathode microstructure. This would be a great advantage, streamlining the manufacturing process by eliminating the need for a post-fabrication infill process.

Accordingly, it would be a significantly advantageous improvement to produce a highly controlled surface layer on SOFC cathode powder particles, after which the particles could be sintered, or alternatively on a fabricated porous cathode structure, possibly made by sintering cathode powders.

SUMMARY DISCLOSURE OF INVENTION

The present invention relates to the fabrication of highly controlled barrier coatings on SOFC cathode powders to reduce migration of cations to the surface of the sintered cathode.

In one aspect, the invention relates to the use of atomic layer deposition (ALD) to deposit a uniform layer of oxide based ceramic films on SOFC cathode powders. The powders are then sintered to form a cathode with improved properties.

In another aspect, the invention relates to the use of oxide based ceramic films fabricated in such a manner as a migration blocking layer on SOFC cathode powders.

In another aspect, the invention relates to the use of oxide based ceramic films fabricated in such a manner as a performance enhancing layer or nanostructures on SOFC cathode powders or pre-fabricated cathode structures.

In yet another aspect, the invention relates to treating a fabricated porous cathode with a performance enhancing layer by ALD.

MODE(S) FOR CARRYING OUT THE INVENTION—DETAILED DESCRIPTION

Figure 1:
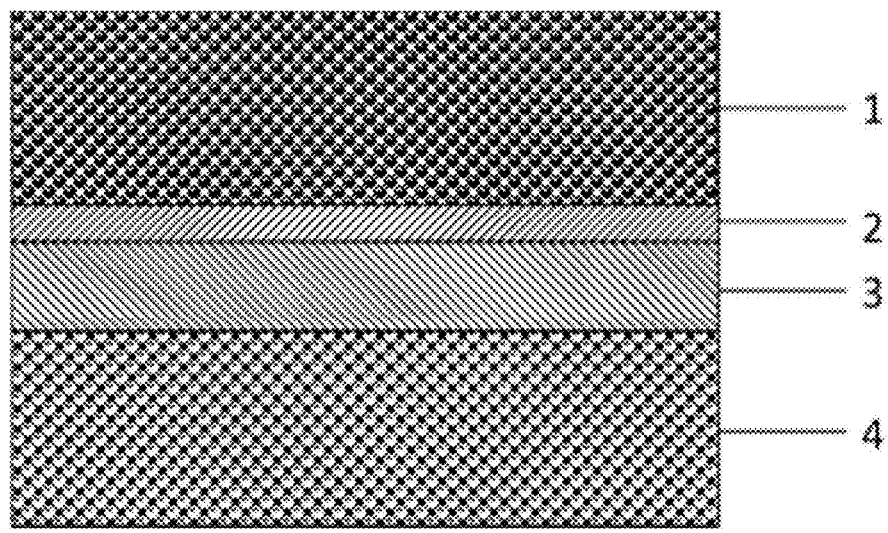
FIG. 1 is a schematic of an SOFC structure showing the layers comprising the device.
Figure 2:
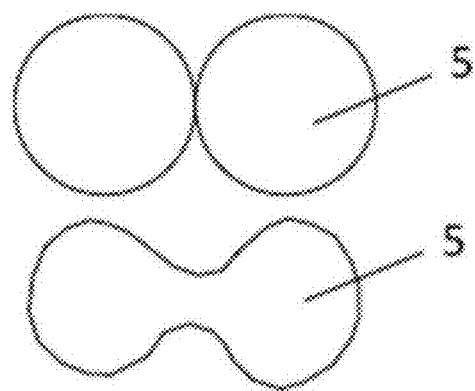
FIG. 2 is a schematic of a sintered structure formed from two particles.

The present invention relates to the fabrication of oxide based ceramic barrier films on SOFC cathode powders by ALD that may be sintered to form porous SOFC cathodes and methods/equipment to perform controlled deposition. A schematic of an SOFC device is shown in FIG. 1 comprising a porous cathode (1), barrier layer (2), electrolyte (3), and porous anode (4). The porous cathode is made by sintering a cathode powder under conditions that permit interconnection of the particles, typically evidenced by necking, yet maintaining an open structure that gas may diffuse into. A schematic of two particles forming a unit of such a structure is shown in FIG. 2, where the particles of cathode powder (5) are joined during the sintering process.

In one aspect, the invention relates to the use of ALD to deposit cerium oxide based films on cathodes and cathode powders. Alloying additions to the ceria films include conductivity enhancing elements such as gadolinium (Gd) and other rare earth lanthanides. Interlayers may also be added, for example, aluminum oxide ($Al_2O_3$) forming a nanolaminate structure. The oxide ALD process uses pulses of a metal cation containing precursor and an oxidizing agent. The pulses are separated by pulses of inert gas to prevent reaction in the gas phase. A series of pulses characterized by a precursor dose pulse, purge pulse, oxidizer pulse, and purge pulse is known as an ALD cycle. In the case of multicomponent oxide films, a super cycle is imposed, where there is a systematic change of the cation in the precursor dose according to the desired ratio of two or more cations. Using cations A and B as examples, the super cycle could be A, B, A, B, etc. or A, A, B, A, A, B, etc. up to any desired ratio of A to B. The process may be carried out under constant flow, or the gas flow may be stopped at intervals during dosing to allow diffusion of species. Further, changes in vacuum level (pressure) may be applied during the pulse cycles.

Metalorganic precursors for yttrium, zirconium, hafnium, cerium, and other rare earths include a number of metalorganic compounds, including ketonates, iminates, alkoxides, amides, amidinates, guanidinates, and cyclopentadienyls. In general, many of these compounds are useful for ALD. Cyclopentadienyls of cerium, e.g $Ce(iPrCp)_3$, of Ce show excellent reactivity with water as an oxidizing agent. Volatile gadolinium sources with good reactivity for water include trispropylcyclopentadienyl Gd ($Gd(iPr-Cp)_3$). Metalorganic precursors for noble metals include cyclopentadienyls, amidinates, guanidinates, and mixed ligand precursors, such as $Pt(Me)_3Cp$. Other oxidants may include ozone or oxygen plasma.

ALD may be carried out with solid or liquid sources held in bubblers through which a carrier gas is flowed to convey the source to the deposition chamber. The sources may also be dissolved in an organic solvent as individual sources or combined together. Key criteria of a solvent system are (1) high boiling point to reduce the chance of flash off of the solvent, (2) high solubility for the compound, (3) low cost. Useful hydrocarbon solvents may include, for example: octane, decane, isopropanol, cyclohexane, tetrahydrofuran, and butyl acetate or mixtures comprising these and other organic solvents. Lewis base adducts may also be incorporated as additions to the solvent(s) for beneficial effects on solubility and to prevent possible oligimerization of the precursor molecules. Examples of useful Lewis Bases include polyamines polyethers, crown ethers, and the like. Pentamethylenediamine is a one example of a polyamine. Examples of polyethers include various glymes such as mono-, di-, tri-, and tetraglyme.

Turning to the deposition process, we note that most ALD processes exhibit what is known as an ALD window with respect to temperature. In this temperature range, growth of the film is surface mononlayer saturation limited. The practical result is that deposition (thickness) per ALD cycle is the same, as long as sufficient material is provided to the surface. After saturation, further supply of material in the gas phase does not increase growth per cycle. The primary objective in the present invention is the formation of a film with highly controlled nanostructure. Crystallinity is also preferred. The upper end of the ALD window temperature range offers a good mix of conformality and the potential for good crystallinity. The lower end of the ALD temperature range window offers the potential for island type growth. Post-deposition annealing in an oxygen containing atmosphere may also be used to promote crystallinity in the film.

Figure 3:
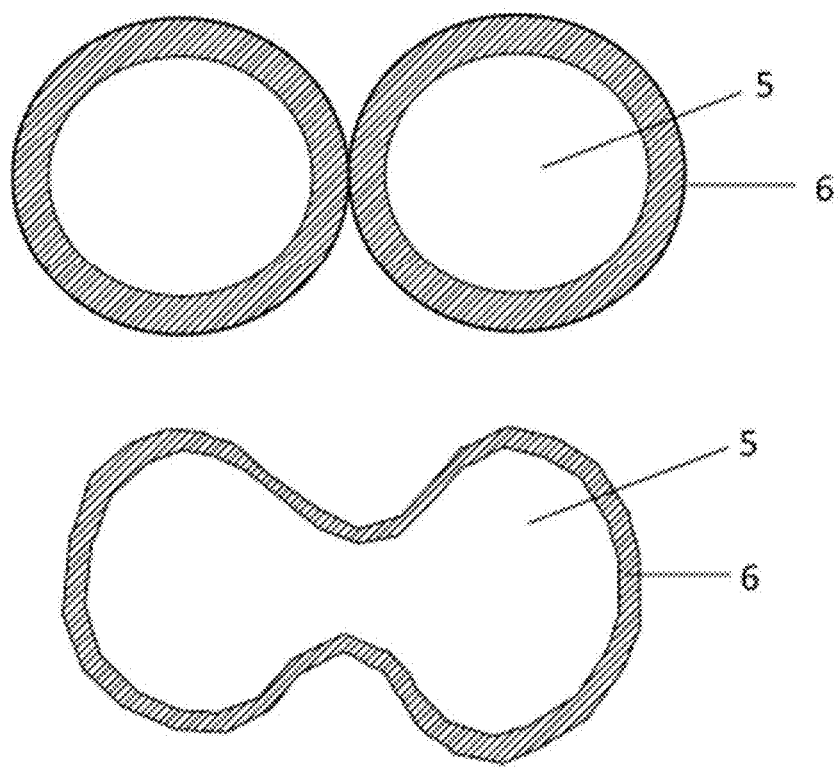
FIG. 3 is a conceptual drawing of a surface modified powder and sintered structure of two example particles to form a barrier coated SOFC cathode.
Figure 4:
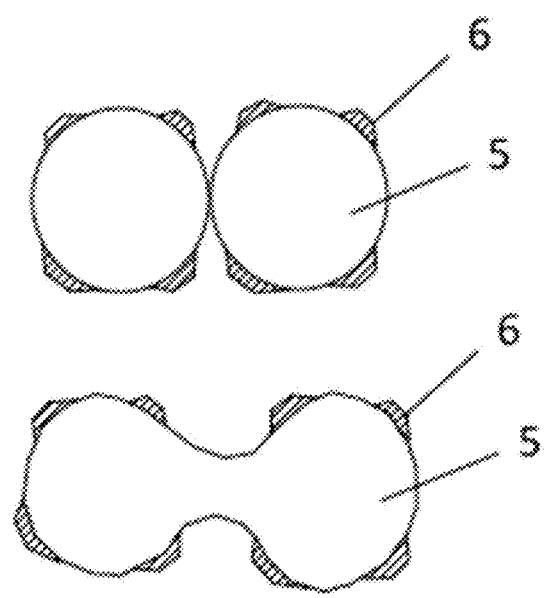
FIG. 4 is a schematic of a discontinuous surface coating on particles and subsequent sintered cathode structure.
Figure 5:
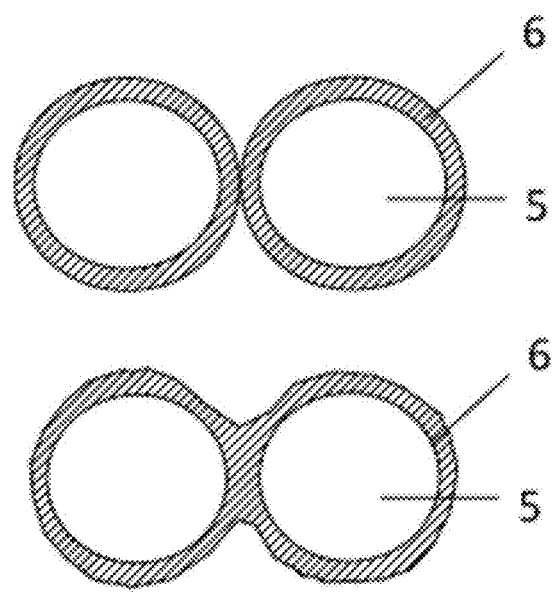
FIG. 5 is a schematic of a continuous surface coating on particles and subsequent sintered cathode structure.

One objective of coating the particles is to create a surface modified particle that may be sintered to into a solid porous cathode for an SOFC. In the case where a continuous coating, or shell, is created, and then sintered, a structure similar to an infilled cathode may be produced (FIG. 3) where the particles (5) maintain substantially their physical and chemical character, but are connected to each other with the surface modifying coating (6) remaining. Other coated nanostructures may be achieved by ALD, for example one with numerous triple phase boundaries (TPBs) (FIG. 4). The TPB is found at the intersection of the two solid phases (cathode particle (5) and ALD coating (6)) and contact with a gas phase. As noted earlier, ALD carried out at the lower end of the ALD temperature window or at temperatures slightly below that defining the lower end of the ALD window may result in island growth. ALD carried out in the ALD window result in uniform coating that may be controlled at the atomic level by controlling the number of cycles. Powders with these nanostructured coatings may be sintered to form a solid structure. Depending on the coating thickness, different final structures may be obtained (FIG. 5), for example a structure where the coating forms the interconnecting web (6) and cathode particles (5).

In the case of a cation migration blocking layer, a substantially continuous coating may be advantageous. This may be achieved with a continuous shell that may potentially crack open during the sintering process. The shell may also stay intact during sintering. For performance enhancement, a second discontinuous coating may be used that results in so-called triple phase boundaries (TPBs) at various locations on the surface of the sintered cathode. An example of such a structure could be nodules on an LSCF powder, optionally with a cation migration blocking layer below the nodules. Other examples include metallic particles with a catalytic effect toward gas dissociation such as platinum, iridium, rhodium, and the like.

It will be appreciated that the shell material may interact with the normal sintering process of an uncoated powder. For long-term stability, the coating should have a similar or even slightly lower sintering temperature compared to the core powder. Suitable migration blocking layers include ceria or doped ceria, e.g. samarium doped ceria, praseodymium doped ceria, lanthanum-calcia doped ceria, lanthanum doped ceria, yttria doped ceria, or gadolinium doped ceria.

Figure 6:
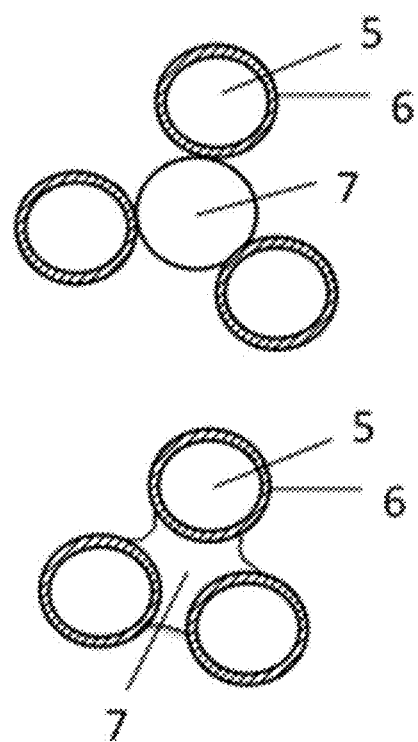
FIG. 6 is a schematic of a hybrid approach to form a sintered cathode from a mixture of coated and uncoated particles.

A hybrid approach may also be employed (FIG. 6), where a sintered cathode is made up from a portion of the cathode powder that is coated and another portion is uncoated. A sintered structure would consist of a network of uncoated powder (7) binding together the coated powder (5,6). This may be advantageous in the case where the sintering temperature of the shell material is high.

Process conditions favorable for ALD of ceria based films are in the temperature range of 150-275° C. with pressures in the range of 1-5 Torr. Surface preparation (termination) can be very important to enhance nucleation in an ALD process. Pre-treatments to promote uniform nucleation include aqueous acids/bases compatible with the substrate and that result in —H or —OH termination of the substrate surface.

Embodiments for ALD of cathode enhancing SOFC films on cathode powders are described in the following examples. The deposition system may have an automated throttle valve that allows pressure to be controlled independently of flow. In this way, residence times can be manipulated more directly. The hot-wall type reactor is one type of reactor that may be used to deposit the subject films. Fluidized beds or levitating gas flows may also be used, or other means of agitation.

Example 1

A samarium doped ceria film is deposited on LSM using $Sm(Me-Cp)_3$ and $Ce(iPr-Cp)_3$ at 230° C. Reactor pressure is 1 Torr. Dose times for $Sm(Me-Cp)_3$, $Ce(iPr-Cp)_3$ and water vapor are 120 seconds. Purge times are 120 seconds. Nitrogen is used to transport the precursors to the deposition chamber and as the inert purge. A number of ALD cycles are used to deposit the film, with a ratio of 6 Ce cycles to 1 Sm cycle.

Example 2

Figure 7:
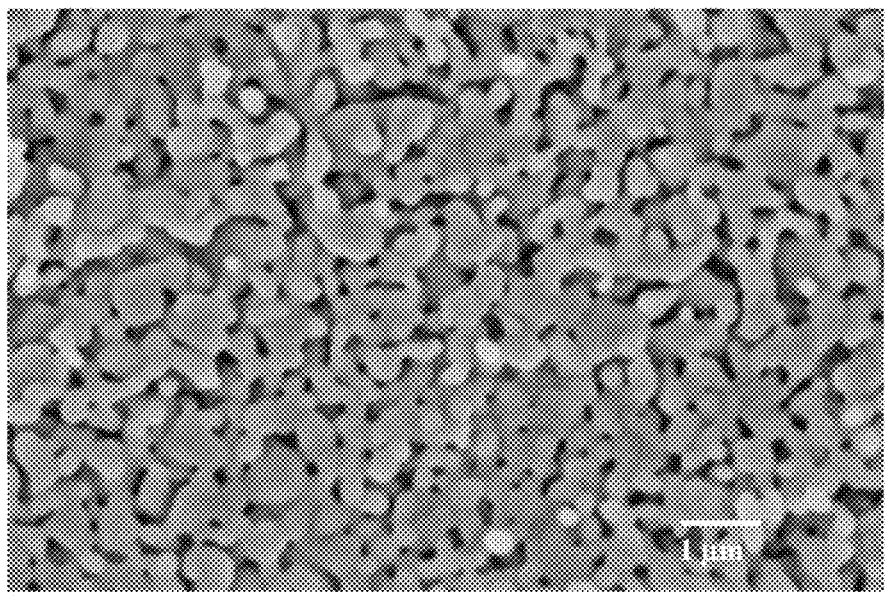
FIG. 7 is a sintered cathode of LSCF fabricated from LSCF particles coated with gadolinium doped ceria (GDC).

A gadolinium doped ceria film is deposited on LSCF powder using $Gd(iPr-Cp)_3$ and $Ce(iPr-Cp)_3$ at 230° C. Reactor pressure is 1 Torr. Dose times for $Gd(iPr-Cp)_3$, $Ce(iPr-Cp)_3$ and water vapor are 120 seconds, respectively. Purge times are 120 seconds. Nitrogen is used to transport the precursors to the deposition chamber and as the inert purge. 12 ALD cycles are used to deposit the film, with a ratio of 5 Ce cycles to 1 Gd cycle. A sintered cathode structure is obtained by pressing the powder into a pellet and sintering at 1000° C. for 1 hr (FIG. 7). Porosity of the cathode structure fabricated from surface modified powder was measured to be 37% compared to 41% for a cathode fabricated from the same powder without surface treatment. Pore size distribution was also very similar. This shows that the desired porous structure of the cathode was not adversely affected by the surface modification of the cathode powder. A symmetrical electrochemical cell was fabricated with the surface modified powder on a scandia stabilized zirconia membrane electrolyte. Total polarization was significantly reduced indicating a dramatic improvement in cell performance.

TABLE 1

Polarization results for symmetrical electrochemical cells fabricated with uncoated (reference) and GDC surface modified LSCF powder. Relative changes compared to unmodified LSCF are shown in parentheses.

| Sample type | # ALD cycles | Total polarization at 800° C. ($\Omega \cdot cm^2$) | Total polarization at 700° C. ($\Omega \cdot cm^2$) | Total polarization at 600° C. ($\Omega \cdot cm^2$) |
|---|---|---|---|---|
| Unmodified LSCF | — | 0.049 | 0.288 | 2.614 |
| GDC modified LSCF | 12 | 0.024 (−51%) | 0.196 (−32%) | 1.455 (−44%) |

Example 3

A gadolinium doped ceria film is deposited on LSCF powder using $Gd(Pr-Cp)_3$ and $Ce(iPr-Cp)_3$ at 240° C. Reactor pressure is 1 Torr. Dose times for $Sm(Me-Cp)_3$, $Ce(iPr-Cp)_3$ and water vapor are 120 seconds. Purge times are 120 seconds. Nitrogen is used to transport the precursors to the deposition chamber and as the inert purge. 5 ALD cycles are used to deposit the film, with a ratio of 5 Ce cycles to 1 Gd cycle.

Example 4

A gadolinium doped ceria film is deposited on LSCF powder using $Gd(iPr-Cp)_3$ and $Ce(iPr-Cp)_3$ at 230° C. Reactor pressure is 1 Torr. Dose times for $Gd(iPr-Cp)_3$, $Ce(iPr-Cp)_3$ and water vapor are 120 seconds. Purge times are 120 seconds. Nitrogen is used to transport the precursors to the deposition chamber and as the inert purge. A number of ALD cycles are used to deposit the film, with a ratio of 5 Ce cycles to 1 Gd cycle. Platinum nodules are then applied via ALD at 200° C. using $Pt(Me)_3Cp$ and water as the co-reactant.

Example 5

A gadloinium doped ceria film is deposited on a sintered LSCF cathode using $Gd(iPr-Cp)_3$ and $Ce(iPr-Cp)_3$ at 230° C. Reactor pressure is 1 Torr. Dose times for $Gd(iPr-Cp)_3$, Ce(iPr-Cp)$_3$ and water vapor are 60 seconds. Purge times are 120 seconds. Nitrogen is used to transport the precursors to the deposition chamber and as the inert purge. 12 ALD cycles are used to deposit the film, with a ratio of 5 Ce cycles to 1 Gd cycle. The total polarization of the treated cell was reduced by more than 50%, indicating dramatically improved electrochemical performance (Table 2)

TABLE 2

Polarization results for pre-fabricated LSCF/SSZ/LSCF symmetrical cells treated in an infiltration mode (post cathode sintering) with GDC via ALD. Relative changes compared to unmodified LSCF are shown in parentheses.

| Sample type | # ALD cycles | Total polarization at 800° C. ($\Omega \cdot cm^2$) | Total polarization at 700° C. ($\Omega \cdot cm^2$) |
|---|---|---|---|
| Unmodified LSCF | — | 0.091 | 0.534 |
| GDC modified LSCF | 12 | 0.042 (−54%) | 0.235 (−56%) |

The subject invention may be embodied in the forgoing examples that are by no means restrictive, but intended to illustrate the invention.

What is claimed is:

1. A solid surface modified porous cathode; the solid surface modified porous cathode comprising sintered surface modified oxide powder particles; the sintered oxide powder particles having an oxide surface layer comprising a metal oxide, wherein the metal is a rare earth element, and wherein a symmetrical electrochemical cell fabricated with the solid surface modified porous cathode has between 32% and 56% lower polarization in ohm cm-squared than a solid unmodified porous cathode comprised of the same oxide powder particles sintered without the oxide surface layer.

2. The solid surface modified porous cathode of claim 1 wherein porosity is at least approximately 37% after the sintering.

3. The solid surface modified porous cathode of claim 1 wherein porosity is less than approximately 41% after the sintering.

4. The solid surface modified porous cathode of claim 1 wherein performance enhancing nodules are deposited on the powder particles before the powder particles are sintered, the nodules forming a discontinuous film, such that triple phase boundaries are thereby created.

5. The solid surface modified porous cathode of claim 1 wherein performance enhancing nodules are deposited on the oxide surface layers on the powder particles before the powder particles are sintered, the nodules forming a discontinuous film, such that triple phase boundaries are thereby created.

6. The solid surface modified porous cathode of claim 1 wherein performance enhancing nodules are deposited on the oxide surface layers on the powder particles after the powder particles are sintered, the nodules forming a discontinuous film, such that triple phase boundaries are thereby created.

7. The performance enhancing nodules of claim 6 wherein the performance enhancing nodules are comprised of metallic Rh.

8. The performance enhancing nodules of claim 6 wherein the performance enhancing nodules are comprised of metallic Pt.

9. The performance enhancing nodules of claim 6 wherein the performance enhancing nodules are comprised of metallic Ir.

10. A solid surface modified porous cathode; the solid surface modified porous cathode comprising sintered surface modified oxide powder particles; the sintered surface modified oxide powder particles having their surface modified by having a deposited metal oxide surface layer before sintering, wherein further the metal oxide surface layer forms an interconnecting web between the sintered surface modified oxide powder particles.

11. The solid surface modified porous cathode of claim 10 wherein a symmetrical electrochemical cell fabricated with the solid surface modified porous cathode has between 32% and 56% lower polarization in ohm cm-squared than a solid unmodified porous cathode comprised of the same oxide powder particles sintered without the oxide surface layer.

12. The solid surface modified porous cathode of claim 10 wherein porosity is at least approximately 37% after the sintering.

13. The solid surface modified porous cathode of claim 10 wherein porosity is less than approximately 41% after the sintering.

14. The solid surface modified porous cathode of claim 10 wherein performance enhancing nodules are deposited on the powder particles before the powder particles are sintered, the nodules forming a discontinuous film, such that triple phase boundaries are thereby created.

15. The solid surface modified porous cathode of claim 10 wherein performance enhancing nodules are deposited on the oxide surface layers on the powder particles before the powder particles are sintered, the nodules forming a discontinuous film, such that triple phase boundaries are thereby created.

16. The solid surface modified porous cathode of claim 10 wherein performance enhancing nodules are deposited on the oxide surface layers on the powder particles after the powder particles are sintered, the nodules forming a discontinuous film, such that triple phase boundaries are thereby created.

17. The performance enhancing nodules of claim 16 wherein the performance enhancing nodules are comprised of metallic Rh.

18. The performance enhancing nodules of claim 16 wherein the performance enhancing nodules are comprised of metallic Pt.

19. The performance enhancing nodules of claim 16 wherein the performance enhancing nodules are comprised of metallic Ir.

* * * * *

UNITED STATES PATENT AND TRADEMARK OFFICE
CERTIFICATE OF CORRECTION

PATENT NO. : 10,381,655 B2
APPLICATION NO. : 15/209747
DATED : August 13, 2019
INVENTOR(S) : Jeffrey F. Roeder, Anthony F. Zeberoff and Peter C. Van Buskirk It is certified that error appears in the above-identified patent and that said Letters Patent is hereby corrected as shown below:

In the Specification

Column 1, Line 11(approx.), please insert:
--This invention was made with government support under contract DOE Award # DE-SC0013116, awarded by the U.S. Department of Energy. The government has certain rights in the invention.--

Signed and Sealed this
Seventh Day of January, 2020

Andrei Iancu
*Director of the United States Patent and Trademark Office*